(12) United States Patent
Lee et al.

(10) Patent No.: US 10,191,909 B2
(45) Date of Patent: Jan. 29, 2019

(54) FILE SYSTEM CREATING AND DELETING APPARATUS AND DRIVING METHOD THEREOF

(71) Applicant: ELECTRONICS AND TELECOMMUNICATIONS RESEARCH INSTITUTE, Daejeon (KR)

(72) Inventors: Sang Min Lee, Daejeon (KR); Young Kyun Kim, Daejeon (KR); Hong Yeon Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 366 days.

(21) Appl. No.: 15/057,312

(22) Filed: Mar. 1, 2016

(65) Prior Publication Data

US 2016/0259801 A1    Sep. 8, 2016

(30) Foreign Application Priority Data

Mar. 3, 2015  (KR) .................... 10-2015-0029682

(51) Int. Cl.
*G06F 17/30* (2006.01)

(52) U.S. Cl.
CPC .. *G06F 17/30117* (2013.01); *G06F 17/30171* (2013.01); *G06F 17/30348* (2013.01); *G06F 17/30359* (2013.01)

(58) Field of Classification Search
CPC ....................................................... G06F 17/30

(Continued)

(56) References Cited

U.S. PATENT DOCUMENTS 6,571,259 B1    5/2003  Zheng et al.
8,484,164 B1 *  7/2013  Sivakumar ............ G06F 3/0611
                                                   707/637

(Continued)

FOREIGN PATENT DOCUMENTS

KR    10-2009-0003045    1/2009

*Primary Examiner* — Kim T Nguyen
(74) *Attorney, Agent, or Firm* — Kile Park Reed & Houtteman PLLC

(57) ABSTRACT

Provided herein is a filing system creating and deleting apparatus, comprising an available inode pool in which inodes are to be stored, a file system object creating processor creating an inode allocating request signal in response to a file system creating request from an external resource, an inode allocating processor allocating at least one of inodes stored in the available inode pool in response to the inode allocating request signal, a file system object deleting processor creating an inode deallocating request signal in response to a file system deleting request from the external resource, an inode deleting thread collecting inodes requested to be deleted corresponding to the file system deleting request, and an inode deallocating processor deallocating the inode requested to be deleted from the inode deleting thread, wherein a number of inodes stored in the available inode pool is limited to no more than a maximum inode number in the available inode pool, and the inode requested to be deleted creates and deletes a file system stored in the available inode pool when the number of inodes stored in the available inode pool is smaller than the maximum inode number in the available inode pool.

11 Claims, 10 Drawing Sheets

(58) Field of Classification Search
USPC .......................................................... 707/692
See application file for complete search history.

(56) References Cited

U.S. PATENT DOCUMENTS

| | | | |
|---|---|---|---|
| 9,870,365 B2* | 1/2018 | Khandelwal | G06F 17/30091 |
| 2008/0133609 A1 | 6/2008 | Lee et al. | |
| 2008/0320052 A1 | 12/2008 | Chandrachari et al. | |
| 2011/0153606 A1 | 6/2011 | Kim et al. | |
| 2012/0101991 A1 | 4/2012 | Srivas et al. | |
| 2013/0138705 A1* | 5/2013 | Agetsuma | G06F 3/0643 |
| | | | 707/822 |
| 2013/0166828 A1 | 6/2013 | Chun | |
| 2014/0181437 A1* | 6/2014 | Bruso | G06F 17/30174 |
| | | | 711/162 |
| 2014/0282758 A1* | 9/2014 | Yu | H04N 21/42646 |
| | | | 725/88 |
| 2015/0120792 A1* | 4/2015 | Khandelwal | G06F 17/30091 |
| | | | 707/825 |

\* cited by examiner

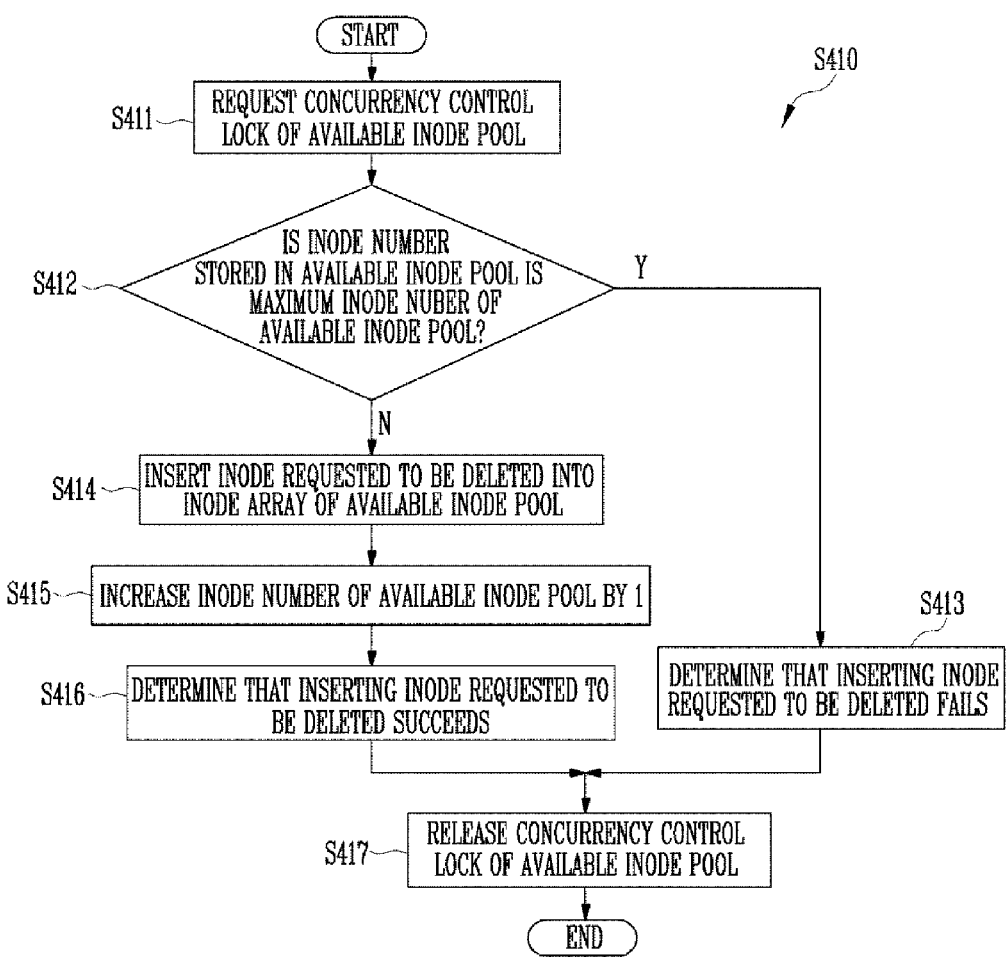

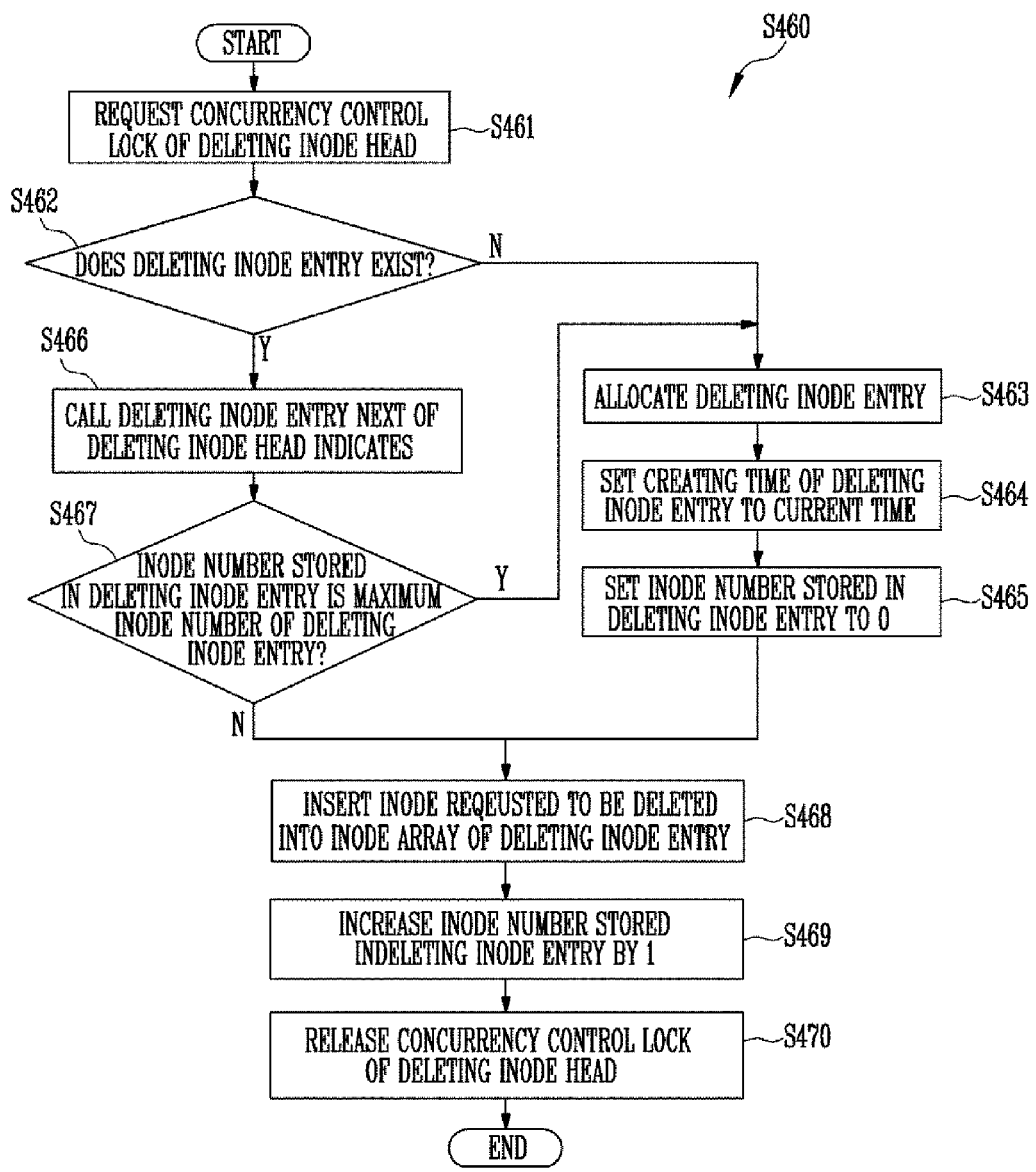

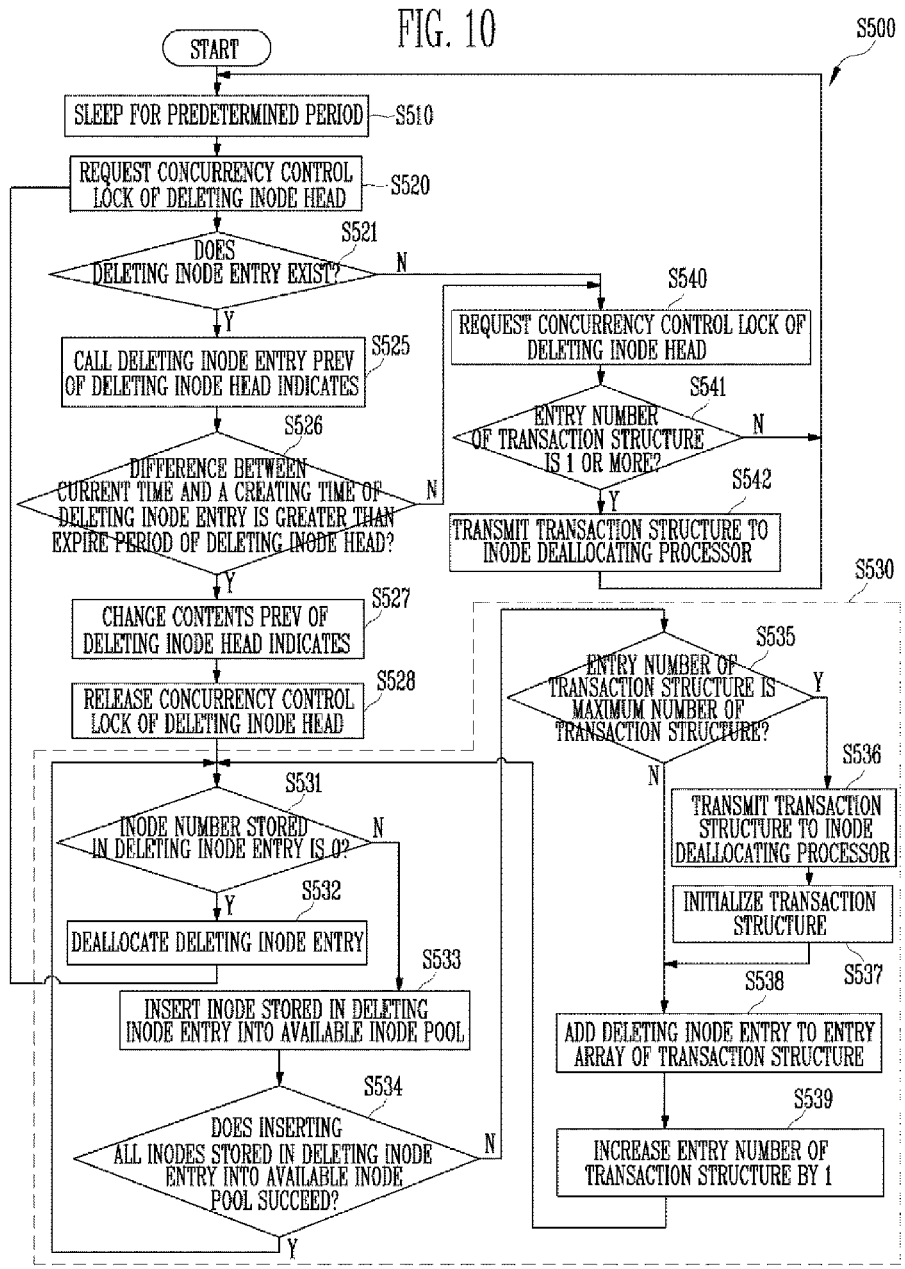

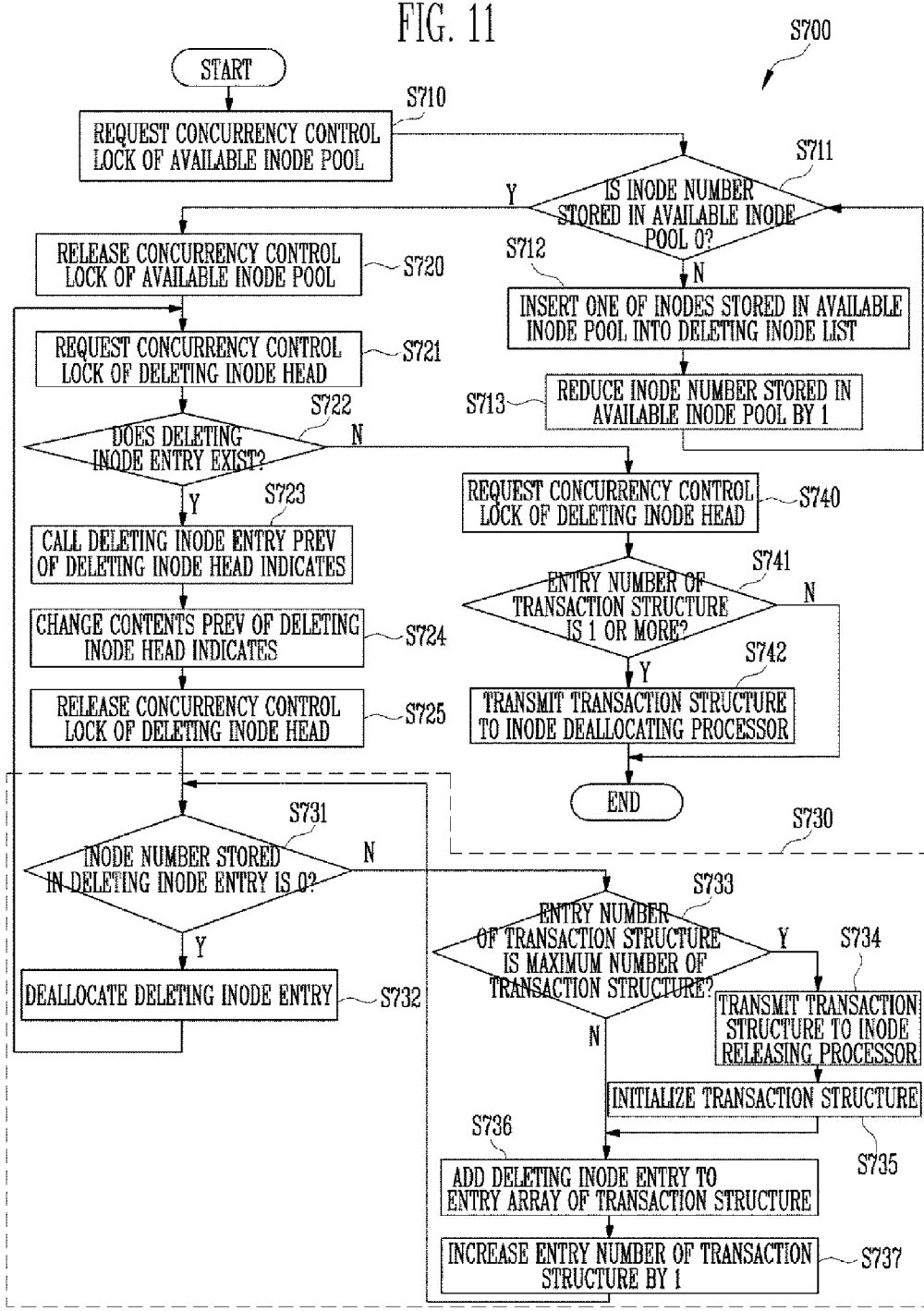

FILE SYSTEM CREATING AND DELETING APPARATUS AND DRIVING METHOD THEREOF

TECHNICAL FIELD

Various embodiments of the present disclosure relate to a file system creating and deleting apparatus and a driving method thereof.

BACKGROUND OF THE INVENTION

Creating and deleting function in a distribution file system is one of the important factors to evaluate a file system. Specifically, in case of the distribution file system, it is frequently requested to create and delete a file or a directory concurrently from a plurality of clients connected to a network. Therefore, the file system is required to effectively process creating and deleting files or directories.

In managing a file system (e.g., a file, directory, etc.), the file system prepares for a file server failure a corresponding file system operates by processing creating and deleting a file system object (hereafter, it is referred to an inode) through a transaction processing based on logging or a transaction such as a database. However, since creating and deleting the inode through the transaction is processed by a single request and updating each inode allocating table (or a bitmap), an inode management cost and a delay time for creating and deleting user files or directories are increased.

DISCLOSURE OF THE INVENTION

Technical Problem

The purpose of the present disclosure is to resolve the aforementioned problems, that is, to provide a file system creating and deleting apparatus in which an inode stored in an available inode pool is allocated when creating a file system and an inode recovered upon a request for deleting an available inode is stored in the available inode pool when deleting the file system, and a driving method thereof.

In addition, an embodiment of the present disclosure provides a file system creating and deleting apparatus storing an inode requested to be deleted in a deleting inode entry and deleting inode entries in a transaction structure, and transmitting the inode to an inode deallocating processor, thereby reducing a management cost by a transaction and a driving method thereof.

Technical Solution

According to an embodiment, a file system creating and deleting apparatus according to an embodiment of the present disclosure may include an available inode pool in which inodes are to be stored, a file system object creating processor creating an inode allocating request signal in response to a file system creating request from an external resource, an inode allocating processor allocating at least one of inodes stored in the available inode pool in response to the inode allocating request signal, a file system object deleting processor creating an inode deallocating request signal in response to a file system deleting request from the external resource, an inode deleting thread collecting inodes requested to be deleted corresponding to the file system deleting request, and an inode deallocating processor deallocating the inode requested to be deleted from the inode deleting thread, wherein a number of inodes stored in the available inode pool is limited to no more than a maximum inode number in the available inode pool, and the inode requested to be deleted creates and deletes a file system stored in the available inode pool when the number of inodes stored in the available inode pool is smaller than the maximum inode number in the available inode pool.

The filing system creating and deleting apparatus may further include an inode table manager managing an inode table on the basis of a signal from the inode allocating processor or the inode deallocating processor.

The available inode pool may include a concurrency control lock controlling accesses from a plurality of processors, the maximum inode number, a number of inodes stored in the available inode pool, and an array of inodes stored in the available inode pool.

A deleting inode list may be stored in the inode deleting thread and the deleting inode list includes a deleting inode head and at least one deleting inode entry, and the inode requested to be deleted is stored in the deleting inode entry when the number of inodes stored in the available inode pool is the maximum inode number in the available inode pool.

The deleting inode head may include a concurrency control lock controlling accesses from a plurality of processors, an expire period in which the deleting inode list maintains, and a pointer including NEXT and PREV indicating one of deleting inode entries, wherein the deleting inode entry includes a pointer including the NEXT and the PREV indicating one of the deleting inode head or another deleting inode entry, a creating time in which the deleting inode entry is created, a maximum number of inodes to be stored in the deleting inode entry, a number of inodes stored in the deleting inode entry, and an array of inodes stored in the deleting inode entry.

The deleting inode entry may be deallocated when a difference between the creating time of the deleting inode entry and a current time is over an expire period of the deleting inode head.

A transaction structure may be transmitted from the inode deleting thread to an inode deallocating processor, wherein the transaction structure includes a maximum number of entries to be stored in the transaction structure, a number of entries stored in the transaction structure, and an array of entries stored in the transaction structure, and wherein the transaction structure is transmitted and inodes requested to be deleted stored in the transaction structure are deallocated when the number of entries in the transaction structure is a maximum entry number in the transaction structure or a predetermined period has elapsed.

A driving method of a filing system creating and deleting apparatus including an available inode pool in which inodes are to be stored, the driving method, may include allocating an inode in response to a file creating request from an external source, and processing an inode requested to be deleted corresponding to a file deleting request from the external source, wherein the allocating of the inode is performed only when the file creating request is received from the external resource and includes allocating one of inodes stored in the available inode pool, wherein the deleting of the inode is performed when the file deleting request is received from the external resource, and includes storing an inode requested to be deleted in the available inode pool.

The filing system creating and deleting apparatus may further include an inode deleting thread including a deleting inode head and at least one deleting inode entry, inodes are to be stored in the deleting inode entry, the processing of the inode requested to be deleted further comprises storing the inode requested to be deleted in the deleting inode entry, the inode requested to be deleted is stored in the available inode pool when a number of inodes stored in the available inode pool is smaller than a maximum inode number in the available inode pool, and the inode requested to be deleted is stored in the deleting inode entry is performed when the number of inodes stored in the available inode pool is the maximum inode number in the available inode pool.

The deleting inode head may include an expire period in which the deleting inode list maintains, the deleting inode entry includes a creating time in which the deleting inode entry is created and an array of inodes stored in the deleting inode entry, the driving method of the filing system creating and deleting apparatus further comprises processing the deleting inode entry, the processing of the deleting inode entry includes comparing a difference between a current time and the creating time with the expire period and deallocating the deleting inode entry, and the deallocating of the deleting inode entry is performed when the difference is greater than the expire period.

The inode deleting thread may transmit a transaction structure to an inode deallocating processor, the transaction structure includes a maximum number of entries to be stored in the transaction structure, a number of entries stored in the transaction structure and an array of entries stored in the transaction structure, the processing of the deleting inode entry includes comparing the maximum number of entries stored in the transaction structure and the number of entries stored in the transaction structure, and the transaction structure is transmitted to the inode deallocating processor when the number of entries stored in the transaction structure is the maximum number of entries stored in the transaction structure.

The driving method may further include deallocating the available inode pool, the deleting inode entry and the transaction structure, the deallocating of the available inode pool, the deleting inode entry and the transaction structure is performed only when a system completing request is received from an external source, and in the deallocating of the available inode pool, the deleting inode entry and the transaction structure, inodes stored in the available inode pool, inodes stored in the deleting inode entry and entries stored in the transaction structure are deleted.

The deallocating of the deleting inode entry may include adding the deleting inode entry to the transaction structure and inserting inode stored in the deleting inode entry into the available inode pool, and the adding of the deleting inode entry to the transaction structure is performed only when the inserting inode stored in the deleting inode entry into the available inode pool fails.

Effects of the Invention

According to an embodiment of the present disclosure, in a file system creating and deleting apparatus and a driving method thereof, inodes stored in an available inode pool may be allocated when a file system object is created, and an inode recovered upon a request for deleting an available inode may be stored when the file system object is deleted.

In addition, according to an embodiment of the present disclosure, in a file system creating and deleting apparatus and a driving method thereof, inodes requested to be deleted may be stored in a deleting inode entry, deleting inode entries are stored in a transaction structure, and the deleting inode entries may be transmitted to an inode deallocating processor when the transaction structure is fill, such that management costs by a transaction may be reduced.

BRIEF DESCRIPTION OF THE DRAWINGS

FIG. 8 is a view of S410 stage illustrated in FIG. 7;

FIG. 9 is a view of S460 stage illustrated in FIG. 7;

FIG. 10 is a view of S500 stage illustrated in FIG. 5; and

FIG. 11 is a view of S700 stage illustrated in FIG. 5;

DETAILED DESCRIPTION OF THE INVENTION

Features of the inventive concept and methods of accomplishing the same may be understood more readily by reference to the following detailed description of embodiments and the accompanying drawings. Hereafter, when it is determined that details of known functions or configurations related to the present disclosure unnecessarily obscures the subject matter of the present disclosure, a specific description thereof will be omitted. In addition, the terms defined in generally used dictionaries should be construed as having the same meanings as would be construed in the context of the related art, and unless clearly defined otherwise in this specification, should not be construed as having idealistic or overly formal meanings.

Figure 1:
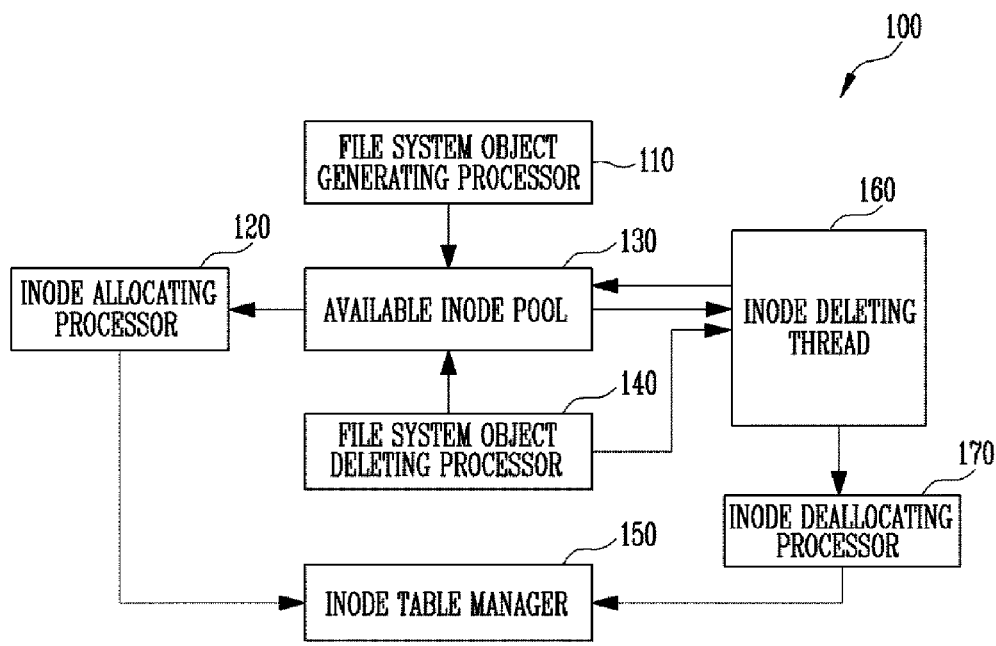
FIG. 1 is a view of a file system creating and deleting apparatus according to an embodiment of the present disclosure.

FIG. 1 is a view of a file system creating and deleting apparatus system according to an embodiment of the present disclosure. Referring to FIG. 1, an apparatus 100 for creating and deleting a file system may include a file system object creating processor 110, an inode allocating processor 120, an available inode pool 130, a file system object deleting processor 140, an inode table manager 150, an inode deleting thread 160 and an inode deallocating processor 170.

The file system object creating processor 110 may create an inode allocating request signal in response to a file system object (e.g., files, directories, etc.) creating request from the external resource.

The inode allocating processor 120 may allocate the inode in response to an inode allocating request signal, transmit a signal to the inode table manager 150 and informs the allocating. When the inode is stored in the available inode pool 130, the inode allocating processor 120 may allocate at least one of the inodes stored in the available inode pool 130 in response to the file system object creating request.

The inode may be stored in the inode pool 130. The number of inodes stored in the available child nodes is limited to the maximum inode number in the available inode pool. A data structure of the inode pool 130 will be described with reference to FIG. 2 as below.

The file system object deleting processor 140 may create an inode deallocating request signal in response to the file deleting request from the external resource.

The inode table manager 150 may manage an inode table based on a signal from the inode allocating processor 120 or the inode deallocating processor 170.

The inode deleting thread 160 may collect an inode requested to be deleted corresponding to a file system deleting request from the external resource. When the number of inodes stored in the available inode pool 130 is smaller than the maximum inode number in the available inode pool 130, the inode requested to be deleted may be stored in the available inode pool 130. The inode deleting thread 160 will be described in more detail with reference to FIG. 4.

The inode deallocating processor 170 may deallocate the inode from the inode deleting thread 160, transmit a signal to the inode table manager 150 and inform the fact that the inode is deallocated from the inode deleting thread 160.

Figure 2:
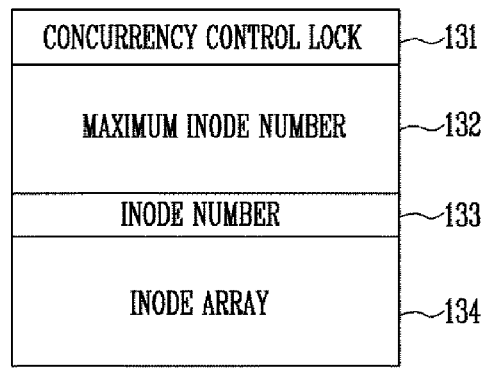
FIG. 2 is a view of a data structure of an available inode pool illustrated in FIG. 1.

FIG. 2 is a view of a data structure of an available inode pool illustrated in FIG. 1 Referring to FIGS. 1 and 2, the available inode pool 130 may include a concurrency control lock 131, a maximum inode number 132, an inode number 133 and an inode array 134.

The concurrency control lock 131 may controls accesses from a plurality of processors. When accessing the available inode pool 130 at an arbitrary processor, the concurrency control lock 131 may be requested. Due to the concurrency control lock 131, an access from another processor may be delayed or denied.

The maximum inode number 132 may store the maximum number of inodes that may be stored in the available inode pool 130. For example, the maximum inode number may be up to twice as an allocating unit of the inode table.

The inode number 133 may store the number of inodes currently stored in the available inode pool 130.

The inode array 134 may sequentially store the inodes.

Figure 3:
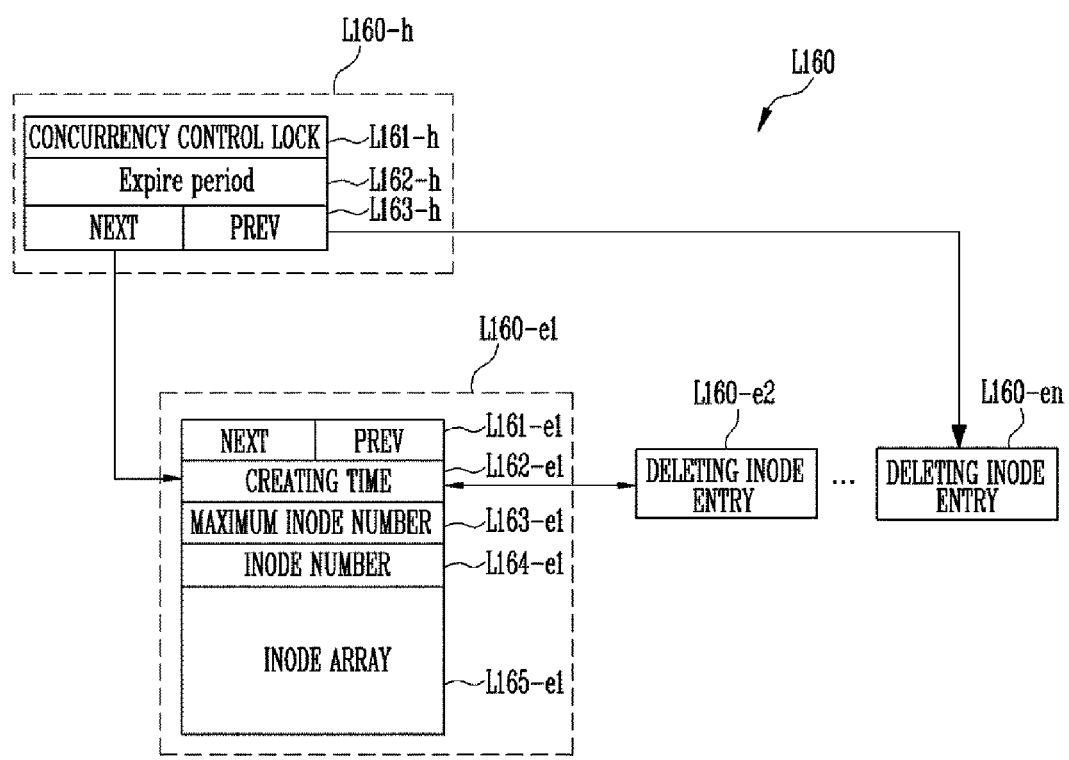
FIG. 3 is a view of a data structure of a deleting inode list stored in an inode deleting thread illustrated in FIG. 1.

FIG. 3 is a view of a data structure of a deleting inode list stored in an inode deleting thread illustrated in FIG. 1. The deleting inode list may be defined as a list in which the inodes requested to be deleted are stored. A deleting inode list L160 illustrated in FIG. 3 may include a deleting inode head L160-*h* and deleting inode entries L160-*e1* to L160-*en* (hereafter, L160-*e*). The deleting inode entry may be a substructure of the deleting inode list and defined as an entry in which the inodes requested to be deleted are stored.

The deleting inode head L160-*h* may include a concurrency control lock L161-*h*, an expire period L162-*h* and a pointer L163-*h*.

The concurrency control lock L161-*h* may control the accesses from the plurality of processors. Since the concurrency control lock L161-*h* is similar to the concurrency control lock 131, a further detailed description will be omitted.

The expire period L162-*h* may store a period in which each deleting inode entry L160-*e* maintains. For example, when the expire period L162-*h* is 10 (ten) minutes, and a time in which the deleting inode entry L160-*e1* is created is 11 minutes earlier than a current time, the deleting inode entry L160-*e1* may be deallocated since the expire period has elapsed.

The pointer L163-*h* may include NEXT and PREV. The NEXT may be a pointer indicating a deleting inode entry most recently created, among the deleting inode delete entries L160-*e*. In an embodiment shown in FIG. 3, the deleting inode entry L160-*e1* has been created most recently. The PREV may be a pointer indicating an earliest created deleting inode entry, among the deleting inode delete entries L160-*e*. In an embodiment shown in FIG. 3, an deleting inode entry L160-*en* has been created most recently.

A data structure of each deleting inode entry L160-*e* will be described as an example of the deleting inode entry L160-*e1*. The deleting inode entry L160-*e1* may include a pointer L161-*e1*, a creating time L162-*e1*, a maximum inode number L163-*e1*, an inode number L164-*e1* and an inode array L165-*e1*.

The pointer L161-*e1* may include the NEXT and the PREV. The NEXT may be a pointer indicating the deleting inode entry created immediately after a corresponding deleting inode entry. The NEXT may be a pointer indicating the deleting inode entry created immediately before a corresponding deleting inode entry. In the case of the deleting inode entry L160-*e1* most recently created, among the deleting inode entries L160-*e1*, the NEXT of the pointer L161-*e1* may indicate the deleting inode head L160-*h*. In the case of the earliest created deleting inode entry L160-*en*, among the deleting inode entries L160-*e*, the PREV of the pointer L161-*en* may indicate the deleting inode head L160-*h*.

The creating time L162-*e1* may store a time in which the deleting inode entry L160-*e1* is created. After calculating a difference between a creating time in which the deleting inode entry L160-*e1* is created and a current time, it is compared whether or not the difference is greater than the expire period L162-*h*.

The maximum inode number L163-*e1* may store the maximum number of inodes that may be stored in the deleting inode entry L160-*e1*. Since the maximum inode number L163-*e1* is similar to the maximum inode number 132, a more detailed explanation will be omitted.

The inode number L164-*e1* may store the number of inodes currently stored in the deleting inode entry L160-*e1*. Since the inode number L164-*e1* is similar to the inode number 133, a more detailed explanation is omitted.

The inode array L165-*e1* may sequentially store the inodes. Since the inode array L165-*e1* is similar to the inode array 134, a more detailed explanation is omitted.

A data structure of each deleting inode entry L160-*e2* to L160-*en* may be similar to a data structure of the deleting inode entry L160-*e1*.

Figure 4:
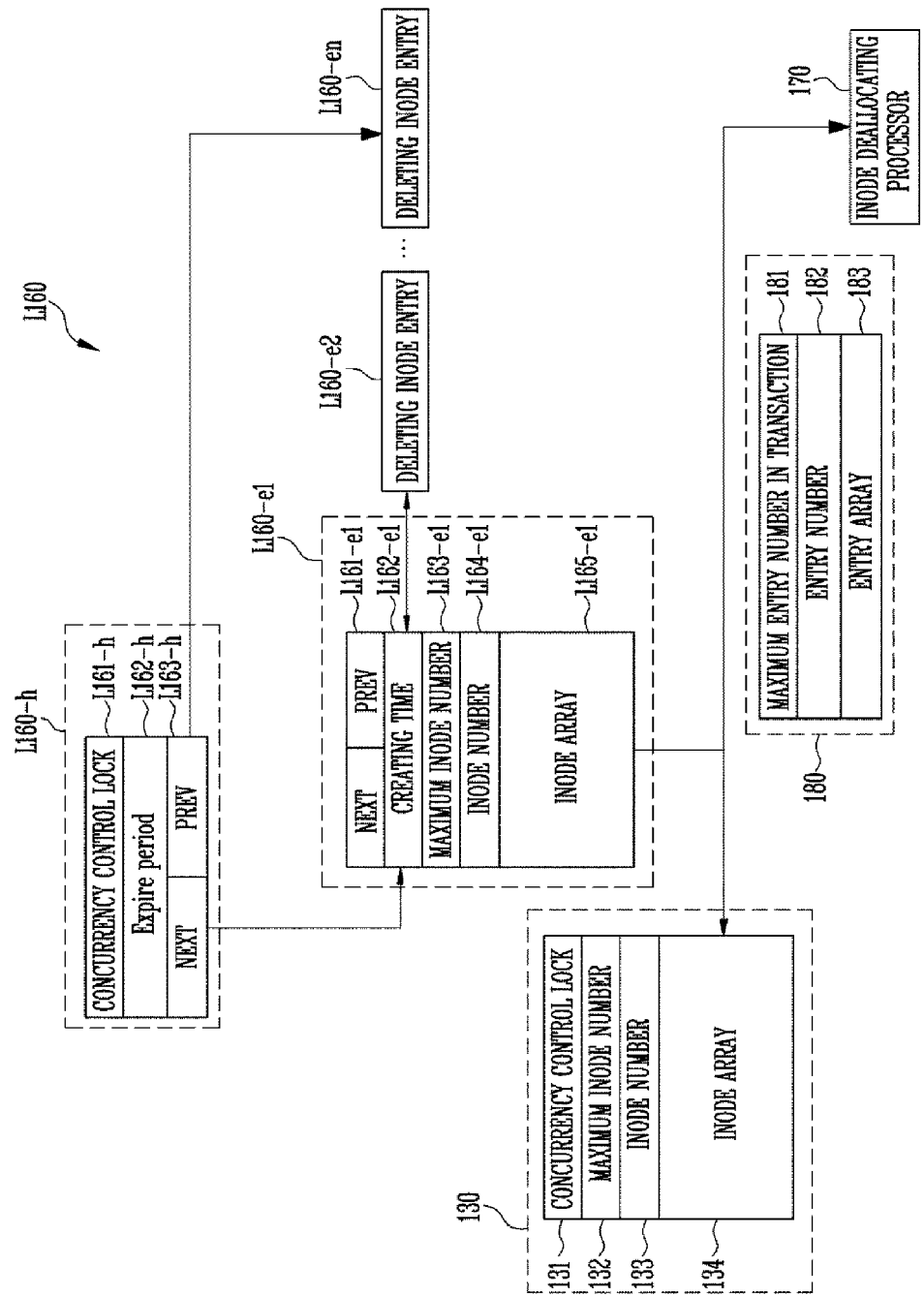
FIG. 4 is a view of an inode deleting thread illustrated in FIG. 1 managing a deleting inode list.

FIG. 4 is a view of an inode deleting thread illustrated in FIG. 1 managing a deleting inode list. Hereinafter, managing the deleting inode list will be described with reference to FIGS. 1 to 4. When the inode requested to be deleted corresponding to a request for deleting the file system from the external resource is created, the inode may be stored in the deleting inode entry the NEXT of the pointer L163-*h* indicates. When the inode number 133 is smaller than the maximum inode number 132, the inode requested to be deleted may be stored in the available inode pool 130 instead of the deleting inode entry.

When the inode requested to be deleted is not stored in the deleting inode entry the NEXT of the pointer L163-*h* indicates, a new deleting inode entry (for example, L160-*e1*) is created, and the NEXT of the pointer L163-*h* may indicate the deleting inode entry L160-*e1*.

The inode deleting thread 160 may periodically bring the earliest created deleting inode entry. In an embodiment shown in FIG. 4, the PREV of the pointer L163-*h* may indicate the deleting inode entry L160-*en*. A difference between the creating time L162-*en* and the current time is calculated, the difference is compared with the expire period L162-*h*. When the difference is greater than the expire period L62-*h*, the deleting inode entry L160-*en* may be deallocated. The inode that may be inserted into the available inode pool 130, among the inodes stored in the deleting inode entry L160-*en*, may be inserted into the available inode pool 130, and the other inodes may be registered in the transaction structure 180. The transaction structure 180 may include a maximum entry number 181, an entry number 182 and an entry array 183.

The maximum entry number 181 may store the maximum number of entries that may be stored in the transaction structure 180, and the entry number 182 may store the number of entries that may be currently stored in the transaction structure 180, and an entry array 183 may sequentially store the deleting inode entry. When the entry number 182 is the maximum entry number 181, the transaction structure 180 may be transmitted to the inode deallocating processor 170, and inode requested to be deleted stored in the transaction structure 180 may be deallocated. When processing a transaction through the transaction structure 180, as an embodiment of the present disclosure, the inodes requested to be deleted may be processed together into a single transaction, such that management cost for inode may be reduced and a delay time of creating and deleting a user file or a directory of may be reduced.

Figure 5:
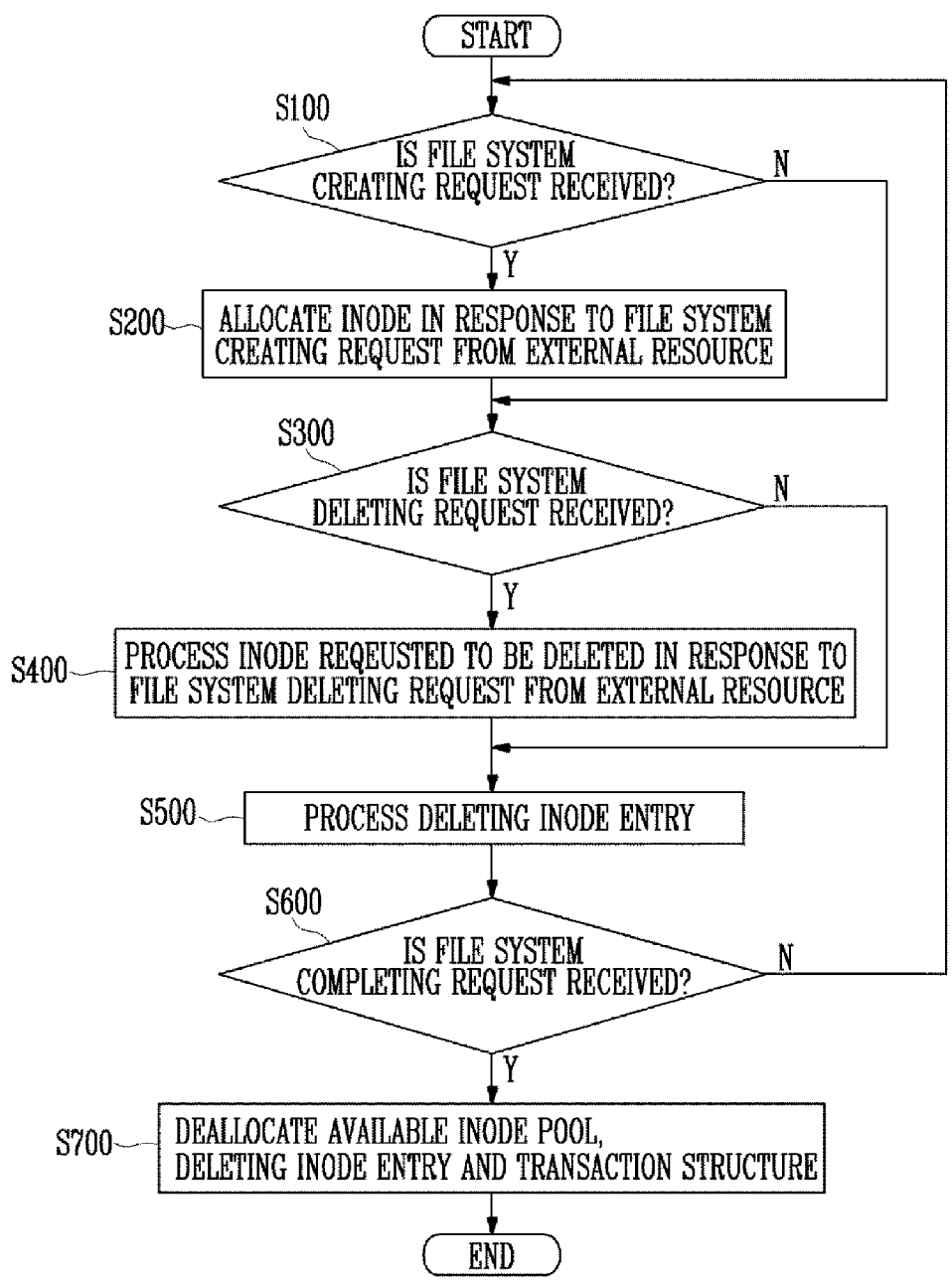
FIG. 5 is a view of a driving method of an apparatus for creating and deleting a file system according to an embodiment of the present disclosure.

FIG. 5 is a view of a driving method of a file system creating and deleting apparatus according to an embodiment of the present disclosure. In the following, a driving method for the file system creating and deleting apparatus will be described with reference to FIGS. 1 to 5.

In a S100 stage, it is determined whether or not a request for creating a file system from the external resource is received. When the request for creating a file system from the external resource is received, the S100 stage may be performed, if not, the S300 stage may be performed.

In a S200 stage, since the request for creating a file system from the external resource is received, the file system object creating processor 110 may create the inode allocating request signal in response to a file system creating request from the external resource and the inode allocating processor 120 may allocate the inode in response to the inode allocating request signal. One of the inodes stored in the available inode pool 130 may be allocated.

In a S300 stage, it is determined whether or not the request for deleting a file system from the external resource is received. When the request for deleting a file system from the external resource is received, the S400 stage may be performed, if not, the S500 stage may be performed.

In a S400 stage, the inode requested to be deleted corresponding to the request for deleting the file system from the external resource may be processed. The inode requested to be deleted may be stored in the inode deleting thread 160 or the available inode pool 130. Details of the S400 stage will be described below with reference to FIGS. 8 and 9.

In a S500 stage, the deleting inode entries L160-*e* may be processed. Details of the S500 stage will be described below with reference to FIG. 10.

In a S600 stage, it is determined whether or not the request for completing the file system from the external resource is received.

In a S700 stage, the available inode pool 130, the deleting inode entry L160-*e* and the transaction structure 180 may be deallocated in response to the request for completing the file system from the external resource. Details of the S700 stage will be described below with reference to FIG. 11.

Figure 6:
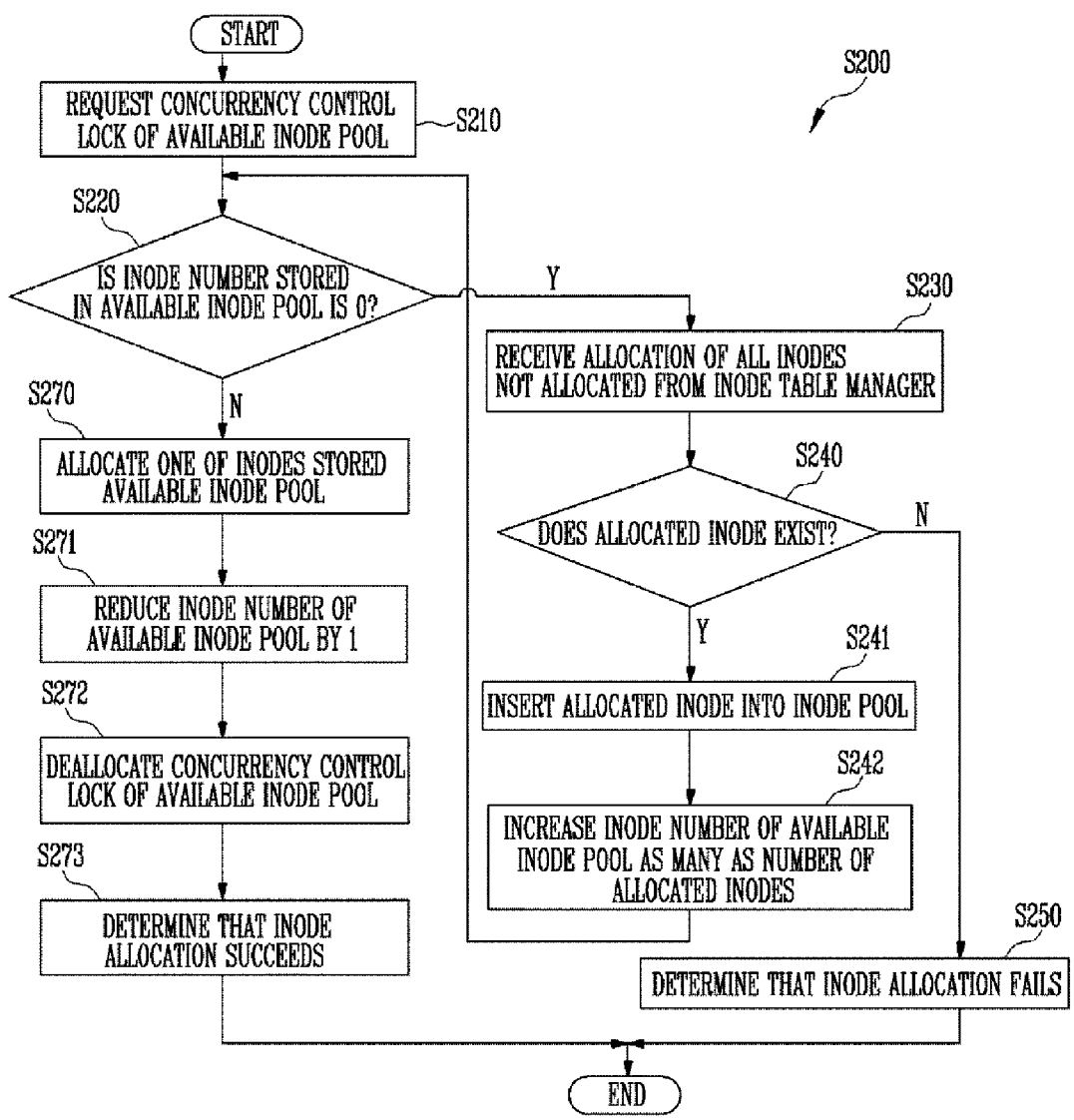
FIG. 6 is a view of S200 stage illustrated in FIG. 5.

FIG. 6 is a view of S200 stage illustrated in FIG. 5. Hereinafter, the S200 stage of the driving method of creating and deleting the file system will be described with reference to FIGS. 1 to 6.

In a S210 stage, the concurrency control lock 131 of the available inode pool 130 may be requested. Since the concurrency control lock 131 is requested, the access from another processor may be delayed or denied.

In a S220 stage, it is determined whether the inode number 133 stored in the available inode pool 130 is 0 (zero). When the inode number 133 is 0 (zero), the S220 stage may be performed, and when the inode number 133 is 1 (one) or more, the S270 stage may be performed In a S230 stage, all inodes that may not be allocated from the inode table manager 150 may be allocated.

In a S240 stage, it is determined whether or not an allocated inode exists. When the allocated inode exists, the S241 stage may be performed, if not, the S250 stage may be performed.

In a S241 stage, the allocated inodes may be inserted (stored) into the inode array 134 in the available inode pool 130.

In a S242 stage, the inode number 133 in the available inode pool 130 may increase as many as the number of allocated inodes. After that, the S220 stage may be performed again, and since the number of inodes is the number of allocated inodes, the stage S270 may be performed.

In a S250 stage, it is determined that an allocation of the inode fails. The apparatus for creating and deleting the file system 100 may create a message that the allocation of the inode fails, or allocate the inode after deallocating the inode allocated in the other source by force.

In a S270 stage, since more than one the inode stored in the available inode pool 130 exists, one of the inode may be allocated.

In a S271 stage, the inode number 133 of the available inode pool 130 by 1 (one). The S271 stage may be performed after the S270 stage, but it is limited to an embodiment. In another embodiment, the S270 stage may be performed after the S271 stage.

In a S272 stage, the concurrency control lock 131 of the available inode pool 130 may be released. After the S272 stage, another process may access the available inode pool 130.

In a S273 stage, it is determined that an allocation of the inode succeeds. The apparatus for creating and deleting the file system 100 may create a message that the allocation of the inode succeeds.

Figure 7:
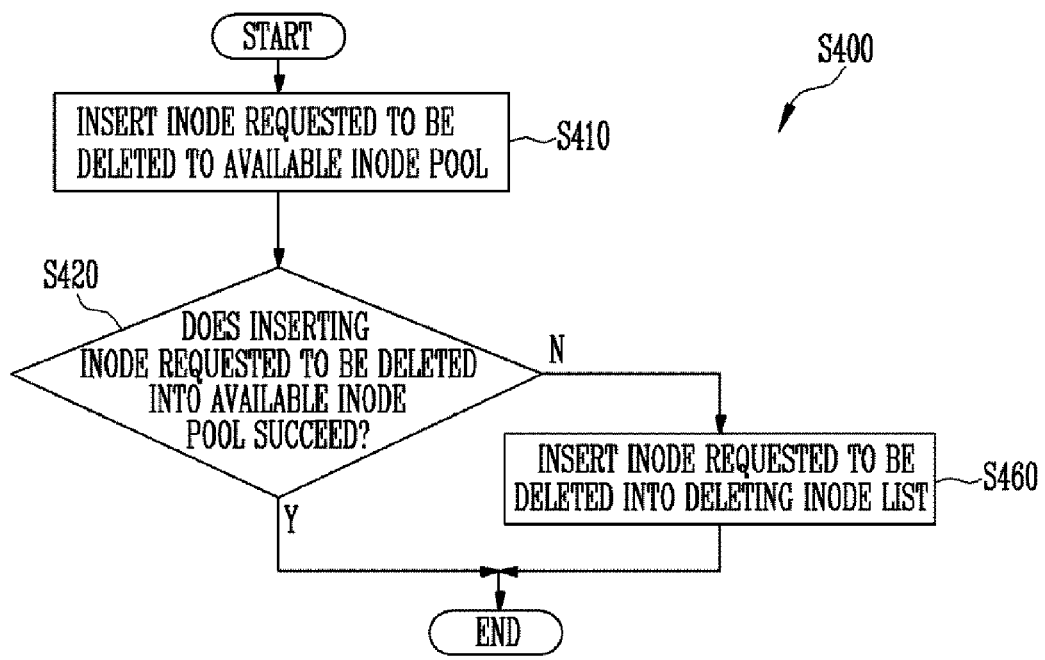
FIG. 7 is a view of S400 stage illustrated in FIG. 5.

FIG. 7 is a view of S400 stage illustrated in FIG. 5.

In a S410 stage, the inode requested to be deleted may be inserted into the available inode pool 130.

In a S420 stage, it is determined whether the inode requested to be deleted is inserted into the available inode pool 130. When the inserting succeeds, the S400 stage may be completed, if not, the S460 stage may be performed.

In a S460 stage, the inode requested to be deleted may be inserted into the deleting inode list.

FIG. 8 is a view of S410 stage illustrated in FIG. 7. Hereinafter, S410 stage will be described with reference to FIGS. 1 to 8.

In a S411 stage, the concurrency control lock 131 of the available inode pool 130 may be requested. Since concurrency control lock 131 is requested, the access from another processor may be delayed or denied.

In a S412 stage, it is determined whether the inode number 133 stored in the available inode pool 130 is the maximum inode number 132. When the inode number 133 is the maximum inode number 132, the S413 stage may be performed, and when the inode number 133 is not the maximum inode number 132, the S414 stage may be performed In a S413 stage, since the inode number 133 stored in the available inode pool 130 is the maximum inode number 132, it is determined that inserting the inode requested to be deleted fails. The apparatus for creating and deleting the file system 100 may create a message that the allocating the inode fails.

In a S414 stage, the inode requested to be deleted may be inserted into the inode array 134 of the available inode pool 130. Since the inode number 133 is smaller than the maximum inode number 132, the inode may be inserted.

In a S415 stage, the inode number 133 of the available inode pool 130 (133) may be increased by 1 (one).

In a S416 stage, it is determined that inserting the inode requested to be deleted succeeds. The apparatus for creating and deleting the file system 100 may create a message that allocating the inode succeeds.

In a S417 stage, the concurrency control lock 131 of the available inode pool 130 may be released. After the S417 stage, another process may access the available inode pool 130.

FIG. 9 is a view of S460 stage illustrated in FIG. 7. Hereinafter, S460 stage will be described with reference to FIGS. 1 to 9.

In a S461 stage, the concurrency control lock L161-*h* of the deleting inode list head L160-*h* may be requested. Since the concurrency control lock L161-*h* is requested, the access from another processor may be delayed or denied.

In a S462 stage, it is determined whether there is the deleting inode entry. When there is the deleting inode entry, a S466 stage may be performed, if not, a S463 stage may be performed.

In a S463 stage, a new deleting inode entry may be allocated. For the convenience of explanation, the deleing inode entry L160-*e*1 is designated to be newly allocated.

In a S463 stage, a creating time of the deleting inode entry may be set to the current time. A creating time L162-*e*1 of the deleting inode entry L160-*e*1 may be set to the current time.

In a S465 stage, the number of inodes stored in the deleting inode entry may be set to 0 (zero). The inode number L164-*e*1 of the deleting inode entry L160-*e*1 may be set to 0 (zero).

In a S466 stage, since there is the deleting inode entry, the deleting inode entry the NEXT of the deleting inode head L160-*h* indicates may be called called. The deleting inode entry most recently created, among the deleting inode entries may be called. For the convenience of explanation, the deleting inode entry L160-*e*1 the NEXT of the pointer L163-*h* indicates is designated to be called.

In a S467 stage, it is determined whether the number of inodes stored in a called deleting inode entry is the maximum number of inodes in the deleting inode entry. The inode number L164-*e*1 of the deleting inode entry L160-*e*1 may be compared with the maximum inode number L163-*e*1. When the inode number L164-*e*1 is the same as the maximum inode number L163-*e*1, a S463 stage may be performed. When the inode number 164-*e*1 is smaller than the maximum inode number L163-*e*1, a S468 stage may be performed.

In a S468 stage, since the inode number L164-*e*1 is smaller than the maximum inode number L163-*e*1, the inode requested to be deleted may be inserted into the inode array L165-*e*1 of the deleting inode entry L160-*e*1 may be inserted.

In a S469 stage, the inode number L164-*e*1 of the deleting inode entry L160-*e*1 may be increased by 1 (one).

In a S470 stage, the concurrency control lock L161-*h* of the deleting inode list head L160-*h* may be released. After the S470 stage, another process may access the available inode pool 130.

FIG. 10 is a view of S500 stage illustrated in FIG. 5.

In a S510 stage, the inode deleting thread 160 may be sleeped for a predetermined period.

In a S520 stage, the concurrency control lock L161-*h* of the deleting inode list head L160-*h* may be requested. Since the S520 stage and the S461 stage are similar as each other, detailed description will be omitted.

In a S521 stage, it is determined whether there is the deleting inode entry. When there is the deleting inode entry, a S525 stage may be performed, if not, a S540 stage may be performed. Since the S521 stage and the S462 stage are similar as each other, detailed description will be omitted.

In a S525 stage, the inode deleting thread 160 may call the deleting inode entry the PREV of the pointer 163-*h* if the deleting inode list head 160-*h* indicates. That is, the earliest created deleting inode entry, among the deleting inode entries may be called. For the convenience of explanation, the deleting inode entry L160-*en* is designated to be called.

In a S526 stage, a difference between the current time and the deleting inode entry may be compared with the expire period of the deleting inode head. When the difference is greater than the expire period, a S527 stage may be performed. When the difference is smaller than the expire period, since all deleting inode entries L160-*e* are created within the expire period rather than the current time, a S540 stage may be performed.

In a S527 stage, contents the PREV of the deleting inode head indicates may be changed. Since the deleting inode entry L160-*en* is not created within the expire period than the current time, the deleting inode entry L160-*en* may be determined to be deallocated. The PREV of the pointer 163-*h* may indicate another deleting inode entry or nothing.

In a S528 stage, the concurrency control lock L161-*h* of the deleting inode list head L160-*h* may be released. Since the S531 stage and the S470 stage are similar as each other, detailed description will be omitted.

In a S530 stage, the deleting inode entry L160-*en* may be deallocated.

In a S530 stage, the inodes stored in the inode array L165-*en* of the deleting inode entry L160-*en* may be inserted into the available inode pool 130. Alternatively, the deleting inode entry L160-*en* may be added to the transaction structure 180.

In a S531 stage, it is determined whether the inode number 133 is 0 (zero). When the inode number L164-*en* 0 (zero), the S532 stage may be performed, and when the inode number L164-*en* is 1 (one) or more, the S533 stage may be performed In a S532 stage, since there is not the inode stored in the deleting inode entry L160-*en*, the deleting inode entry L160-*en* may be deallocated.

In a S533 stage, the inode array L165-*en* stored in the deleting inode entry L160-*en* may be inserted into the available inode pool 130. Each inode stored in the inode array L165-*en* may be inserted into the available inode pool 130. Since inserting each inode into the available inode pool 130 is very similar to the S200 stage, detailed description will be omitted.

In a S534 stage, it is determined whether or not inserting all inodes stored in the deleting inode entry into the available inode pool succeeds. When the inserting succeeds, the S531 stage may be performed. If not, since the maximum inode number 132 of the available inode pool 130 is the same as the inode number 133, the S535 stage may be performed. In the S535 to S538 stages, a corresponding deleting inode entry may be added to the transaction structure 180.

In a S535 stage, it is determined whether the entry number 182 of the transaction structure 180 is the maximum entry number 181. When the entry number 182 is the maximum entry number 181, a S541 stage may be performed. When the entry number 182 is smaller than the maximum entry number 181, a S543 stage may be performed.

In a S536 stage, since the entry number 182 is the same as the maximum entry number 181, a corresponding transaction structure 180 may be transmitted to the inode deallocating processor 170. the inodes stored in the entry array 183 in the transaction structure 180 transmitted to the inode deallocating processor 170 may be deallocated, and the inode deallocating processor 170 may transmit a signal notifying that the allocating is deallocated to the inode table manager 150.

In a S537 stage, the transaction structure 180 may be initialized. A new transaction structure may be created after the transaction structure is once deallocated.

In a S538 stage, a corresponding deleting inode entry L160-en may be added to an entry array 183 of the transaction structure 180.

In a S539 stage, the entry number 182 of the transaction structure 180 may be increased by 1 (one). After the deleing inode entry L160-en is deallocated, a S531 stage may be performed. According to an embodiment illustrated in FIG. 10, the S539 stage may be performed after the S538 stage, but it is limited to an embodiment. The S538 stage may be performed after the S539 stage.

In a S540 stage, the concurrency control lock L161-h of the deleting inode list head L160-h may be released. After the S540 stage, another processor may access the available inode pool 130.

In S541 to S542 stages, since there is no inode entry, the transaction structure 180 may be transmitted to the inode deallocating processor 170. In the S541 stage, when the entry number 182 of the transaction structure 180 is one or more, the S542 stage may be performed, and when the entry number 182 of the transaction structure 180 is 0 (zero), S510 stage may be performed. In the S542 stage, the transaction structure 180 may be transmitted to the inode deallocating processor 170, and the inode included in the entry array 183 of the transaction structure 180 may be deallocated.

FIG. 11 is a view of S700 stage illustrated in FIG. 5. Hereinafter, the step S700 is to be described with reference to FIGS. 1 to 11

In a S710 stage, the concurrency control lock 131 of the available inode pool 130 may be requested. The S710 stage is very similar to the S210 stage.

In a S711 stage, it is determined whether or not the inode number 133 stored in the available inode pool 130 is 0 (zero). The S711 stage is very similar to the S220 stage. When the inode number 133 is 0 (zero), the S720 stage may be performed, if not, the S712 stage may be performed.

In a S712 stage, one of the inodes stored in the inode array 134 of the available inode pool 130 may be inserted into the deleting inode list L160-e. The S712 stage is very similar to the S460 stage. In the S712 stage, the inode is inserted one by one, but it is limited to an embodiment. A plurality of inodes may be inserted into the deleting inode list at the same time.

In a S713 stage, the inode number 133 of the available inode pool 130 may be reduced by 1 (one). After that, the S711 stage may be performed.

In a S720 stage, a concurrency control lock 131 of the available inode pool 130 may be released. The S720 stage is very similar to the S272 stage.

In a S721 stage, the concurrency control lock L161-h of the deleting inode list head L160-h may be requested. The S721 stage is very similar to the S461 stage.

In a S722 stage, it is determined whether or not the deleting entry exists. The S722 stage is very similar to the S462 stage. When there is the deleting inode entry, the S723 stage may be performed, if not, the S740 stage may be performed.

In a S723 stage, the inode deleting thread 160 may call the deleting inode entry the PREV of the pointer 163-h of the deleting inode list head 160-h indicates. For the convenience of explanation, the deleting inode entry L160-en is designated to be called. The S723 stage is very similar to the S525 stage.

In a S724 stage, the contents the PREV of the deleting inode head indicates may be changed. The S724 stage is very similar to the S527 stage.

In a S725 stage, the concurrency control lock L161-h of the deleting inode head L160-h may be released. The S725 stage is very similar to the S470 stage. After the S725 stage, the S730 stage may be performed.

In S730 stage, the deleting inode entry L160-en may be deallocated. In the S730 stage, the deleting inode entry L160-en may be moved to the transaction structure 180. When the entry number 182 of transaction structure 180 is equal to the maximum entry number 181, the transaction structure 180 may be transmitted to the inode deallocating processor 170.

In a S731 stage, it is determined whether or not the number of deleting inode entries is 0 (zero). When the inode number L164-en is 0 (zero), the S732 stage may be performed. When the inode number L164-en is 0 (zero) or more, the S733 stage may be performed.

In a S732 stage, since there is no inode stored in the deleting inode entry L160-en, the deleting inode entry L160-en may be deallocated. After that, the S721 stage may be performed.

In a S733 stage, it is determined whether or not the entry number 182 of the transaction structures 180 is the maximum entry number 181 of the transaction structure 180. When entry number 182 is equal to the maximum entry number 181, the S734 stage may be performed. When entry number 182 is smaller than the maximum entry number 181, the S736 stage may be performed. The S733 stage is very similar to the S535 stage.

In a S734 stage, since the entry number 182 is equal to maximum entry number 181, the transaction structure 180 may be transmitted to the inode deallocating processor 170. The allocation of the inodes stored in the entry array 183 in the transaction structure 180 transmitted to the inode deallocating processor 170 may be deallocated, the inode deallocating processor 170 may transmit a signal indicating that the allocation is deallocated to the inode table manager 150.

In a S735 stage, the transaction structure 180 may be initialized. Once the transaction structure is deallocated, a new transaction structure may be created.

In a S736 stage, a corresponding deleting inode entry L160-en may be added to the entry array 183 of the transaction structure 180.

In s S737 stage, the entry number 182 of the transaction structure 180 may be increased by 1 (one). After the deleting inode entry L160-en is deallocated, the S731 stage may be performed. According to an embodiment of FIG. 11, the S737 stage may be performed after the S736 stage, but it is limited to an embodiment. The S736 may be performed the S737.

In a S740 stage, the concurrency control lock L161-$h$ of the deleting inode list head L160-$h$ may be released.

In stages S741 to step S742, since there is no deleting inode entry, the transaction structure 180 may be transmitted to the inode deleting processor 170. In the S741 stage, when the entry number 182 of the transaction structure 180 is one or more, the S742 stage may be performed, and when the entry number 182 of the transaction structure 180 is 0 (zero), the S700 stage may be terminated. In the S742 stage, the transaction structure 180 may be transmitter to the inode deleting processor 170, the allocation of the inode stored in the entry array 183 of the transaction structure 180 may be deallocated. After the S742 stage is performed, the S700 stage may be terminated.

It will be understood by those of skill in the art that various changes in form and details may be made without departing from the spirit and scope of the present disclosure as set forth in the following claims. Therefore, the technical range of the present disclosure is not limited to the detailed description of the specification but defined by the range of the claims.

DESCRIPTION OF REFERENCE NUMERALS

130: An available inode pool
160: An inode deleting thread
L160-$h$: A deleting inode list head
L160-$e$: Deleting inode entries

The invention claimed is:

1. A filing system creating and deleting apparatus, comprising:
   an available inode pool in which inodes are to be stored;
   a file system object creating processor creating an inode allocating request signal in response to a file system creating request from an external resource;
   an inode allocating processor allocating at least one of inodes stored in the available inode pool in response to the inode allocating request signal;
   a file system object deleting processor creating an inode deallocating request signal in response to a file system deleting request from the external resource;
   an inode deleting thread collecting inodes requested to be deleted corresponding to the file system deleting request; and
   an inode deallocating processor deallocating the inode requested to be deleted from the inode deleting thread,
   wherein a number of inodes stored in the available inode pool is limited to no more than a maximum inode number in the available inode pool, and the inode requested to be deleted creates and deletes a file system stored in the available inode pool when the number of inodes stored in the available inode pool is smaller than the maximum inode number in the available inode pool,
   wherein a deleting inode list is stored in the inode deleting thread and the deleting inode list includes a deleting inode head and at least one deleting inode entry, and
   the inode requested to be deleted is stored in the deleting inode entry when the number of inodes stored in the available inode pool is the maximum inode number in the available inode pool.

2. The filing system creating and deleting apparatus of claim 1, further comprising an inode table manager managing an inode table on the basis of a signal from the inode allocating processor or the inode deallocating processor.

3. The filing system creating and deleting apparatus of claim 1, wherein the available inode pool comprises:
   a concurrency control lock controlling accesses from a plurality of processors;
   the maximum inode number;
   a number of inodes stored in the available inode pool; and
   an array of inodes stored in the available inode pool.

4. The filing system creating and deleting apparatus of claim 1, wherein the deleting inode head comprises:
   a concurrency control lock controlling accesses from a plurality of processors;
   an expire period in which the deleting inode list maintains; and
   a pointer including NEXT and PREV indicating one of deleting inode entries,
   wherein the deleting inode entry comprises:
   a pointer including the NEXT and the PREV indicating one of the deleting inode head or another deleting inode entry;
   a creating time in which the deleting inode entry is created;
   a maximum number of inodes to be stored in the deleting inode entry;
   a number of inodes stored in the deleting inode entry; and
   an array of inodes stored in the deleting inode entry.

5. The filing system creating and deleting apparatus of claim 4, wherein the deleting inode entry is deallocated when a difference between the creating time of the deleting inode entry and a current time is over an expire period of the deleting inode head.

6. The filing system creating and deleting apparatus of claim 1, wherein a transaction structure is transmitted from the inode deleting thread to an inode deallocating processor, wherein the transaction structure comprises:
   a maximum number of entries to be stored in the transaction structure;
   a number of entries stored in the transaction structure; and
   an array of entries stored in the transaction structure, and
   wherein the transaction structure is transmitted and inodes requested to be deleted stored in the transaction structure are deallocated when the number of entries in the transaction structure is a maximum entry number in the transaction structure or a predetermined period has elapsed.

7. A driving method of a filing system creating and deleting apparatus including an available inode pool in which inodes are to be stored, the driving method, comprising:
   allocating an inode in response to a file creating request from an external source; and
   processing an inode requested to be deleted corresponding to a file deleting request from the external source,
   wherein the allocating of the inode is performed only when the file creating request is received from the external resource and includes allocating one of inodes stored in the available inode pool,
   wherein the deleting of the inode is performed when the file deleting request is received from the external resource, and includes storing an inode requested to be deleted in the available inode pool,
   wherein the filing system creating and deleting apparatus further comprises an inode deleting thread including a deleting inode head and at least one deleting inode entry, inodes are to be stored in the deleting inode entry, the processing of the inode requested to be deleted further comprises storing the inode requested to be deleted in the deleting inode entry, the inode requested to be deleted is stored in the available inode pool when a number of inodes stored in the available inode pool is smaller than a maximum inode number in the available inode pool, and the inode requested to be deleted is stored in the deleting inode entry is performed when the number of inodes stored in the available inode pool is the maximum inode number in the available inode pool.

8. The driving method of claim 7, wherein the deleting inode head includes an expire period in which the deleting inode list maintains, the deleting inode entry includes a creating time in which the deleting inode entry is created and an array of inodes stored in the deleting inode entry, the driving method of the filing system creating and deleting apparatus further comprises processing the deleting inode entry, the processing of the deleting inode entry includes comparing a difference between a current time and the creating time with the expire period and deallocating the deleting inode entry, and the deallocating of the deleting inode entry is performed when the difference is greater than the expire period.

9. The driving method of claim 8, wherein the inode deleting thread transmits a transaction structure to an inode deallocating processor, the transaction structure includes a maximum number of entries to be stored in the transaction structure, a number of entries stored in the transaction structure and an array of entries stored in the transaction structure, the processing of the deleting inode entry includes comparing the maximum number of entries stored in the transaction structure and the number of entries stored in the transaction structure, and the transaction structure is transmitted to the inode deallocating processor when the number of entries stored in the transaction structure is the maximum number of entries stored in the transaction structure.

10. The driving method of claim 9, further comprising deallocating the available inode pool, the deleting inode entry and the transaction structure, the deallocating of the available inode pool, the deleting inode entry and the transaction structure is performed only when a system completing request is received from an external source, and in the deallocating of the available inode pool, the deleting inode entry and the transaction structure, inodes stored in the available inode pool, inodes stored in the deleting inode entry and entries stored in the transaction structure are deleted.

11. The driving method of claim 9, wherein the deallocating of the deleting inode entry comprises adding the deleting inode entry to the transaction structure and inserting inode stored in the deleting inode entry into the available inode pool, and the adding of the deleting inode entry to the transaction structure is performed only when the inserting inode stored in the deleting inode entry into the available inode pool fails.

* * * * *